US005413716A

United States Patent [19]
Osborne

[11] Patent Number: 5,413,716
[45] Date of Patent: May 9, 1995

[54] OIL RECOVERY SYSTEM FOR A VEHICLE MAINTENANCE FACILITY

[76] Inventor: William T. Osborne, 2444 - 205th St., No. 4, Torrance, Calif. 90501

[21] Appl. No.: 167,395

[22] Filed: Dec. 14, 1993

Related U.S. Application Data

[63] Continuation-in-part of Ser. No. 986,122, Dec. 4, 1992, Pat. No. 5,277,827.

[51] Int. Cl.⁶ .......................................... B01D 17/038
[52] U.S. Cl. .................................. 210/787; 184/1.5;
 210/168; 210/248; 210/257.1; 210/261;
 210/806
[58] Field of Search ............. 210/167, 168, 171, 172,
 210/241, 248, 259, 257.1, 261, 295, 258, 360.1,
 416.1, 416.5, 424, 787, 799, 805, 806, 195.1;
 184/1.5, 6.24

[56] References Cited

U.S. PATENT DOCUMENTS

| | | | |
|---|---|---|---|
| 1,706,228 | 3/1929 | Harden et al. | 210/261 |
| 2,244,626 | 6/1941 | Kingston | 210/261 |
| 2,324,763 | 7/1943 | Carruthers | 210/787 |
| 2,895,883 | 7/1959 | Hobson | 210/168 |
| 3,029,898 | 4/1962 | Fraser | 184/1.5 |
| 3,933,638 | 1/1976 | Isley | 210/168 |
| 3,954,611 | 5/1976 | Reedy | 210/241 |
| 5,026,488 | 6/1991 | Mesheau | 210/799 |
| 5,158,677 | 10/1992 | Hewitt et al. | 210/360.1 |
| 5,244,586 | 9/1993 | Hawkins et al. | 210/787 |
| 5,301,724 | 4/1994 | Maxwell | 184/1.5 |

FOREIGN PATENT DOCUMENTS

666372 6/1979 U.S.S.R. ........................... 184/6.24

*Primary Examiner*—Joseph W. Drodge
*Attorney, Agent, or Firm*—Freilich Hornbaker Rosen

[57] ABSTRACT

A system is described for use in an auto maintenance shop which receives oil from the changing of vehicle oil and oil filters, to recycle the oil. The system includes an apparatus (10) that has a tank reservoir (12) for receiving contaminated oil. The apparatus also includes equipment mounted on the housing, comprising a centrifuge (24), a pump device (26), a valve (34), and a porous filter device (40). In a first mode of operation, the pump draws oil from the reservoir to flow through an input tube (36) into the centrifuge, and then to an output tube (38) to flow back to the reservoir. The centrifuge is operated long enough so the amount of oil flowing through it is at least ten times the amount of oil in the reservoir. The valve is then switched to a second mode wherein fluid from the input tube is directed through the pump to the porous filter device, for final cleaning of the oil before returning it to the reservoir.

5 Claims, 2 Drawing Sheets

OIL RECOVERY SYSTEM FOR A VEHICLE MAINTENANCE FACILITY

CROSS-REFERENCE TO RELATED CASE

This is a Continuation-in-Part of U.S. patent application Ser. No. 07/986,122 filed Dec. 4, 1992, now U.S. Pat. No. 5,277,827.

BACKGROUND OF THE INVENTION

Vehicle maintenance shops often change motor oil and oil filters of vehicles, as well as transmission oil. In the more distant past, the oil and filters could be dumped into municipal sewer systems and/or landfill dumps. Environmental legislation has now generally prohibited such dumping. As a result, the waste oil and oil filters are often disposed of in hazardous waste dumps, at considerable cost. There are service companies which will pick up waste oil and recycle it. However, the cost of sending trucks to small shops and pumping out stored oil thereat, and the uncertainty of what chemicals may have been left in storage at the shop in addition to oil, makes it costly for service companies to recycle oil. As a result, small shops often must pay considerable amounts just for service companies to take away their used oil. An apparatus of moderate cost and size, which could be placed in a small vehicle maintenance shop to receive contaminated oil, and which enabled the shop owner to reuse the oil while creating only small amounts of hazardous waste, would be of considerable value to shop owners. Such an apparatus could be used in any shop where contaminated oil must be constantly disposed of and cleaned oil must be constantly used.

SUMMARY OF THE INVENTION

In accordance with one embodiment of the present invention, an oil cleaning apparatus is provided for us in vehicle maintenance shops and other oil using and disposal shops, which enables the recycling of contaminated oil at moderate cost. The system includes a housing that forms a reservoir and includes equipment on the housing which comprises a centrifuge, pump device, directional valve, input and output tubes, and a porous filter device. Contaminated oil is dumped into the reservoir whenever it must be disposed of. When enough contaminated oil has accumulated so it largely fills the reservoir, the equipment is ready to be operated. The valve device is switched to a first state, the pump is energized, and the equipment is operated to pump oil out of the reservoir and through the centrifuge. The centrifuge removes water and dirt, with the largely clean oil delivered back to the reservoir. The centrifuge is operated continually until the amount of oil that has passed through the centrifuge for cleaning, is a plurality of times greater than the capacity of the oil reservoir, and preferably at least ten times as great. The valve device is then switched to a second state, where oil is drawn out of the reservoir and pumped through the porous filter device where the last bits of contaminants are removed, the very clean oil then being discharged back to the reservoir. After the oil is pumped through the filter device a plurality of times, the pump is deenergized, and the reservoir contains clean oil which can be removed for reuse.

The novel features of the invention are set forth with particularity in the appended claims. The invention will be best understood from the following description when read in conjunction with the accompanying drawings.

DESCRIPTION OF THE PREFERRED EMBODIMENT

Figure 1:
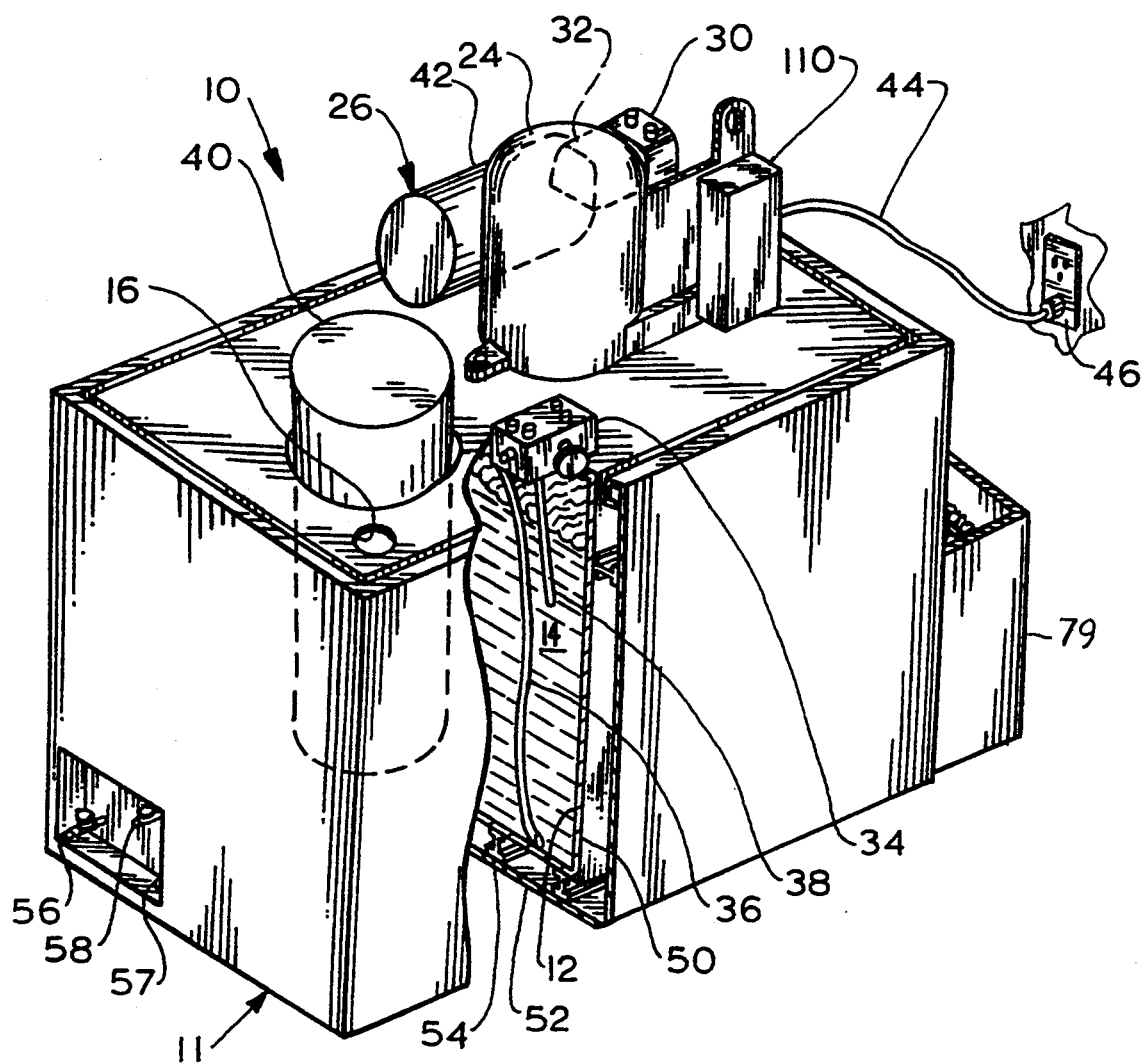
FIG. 1 is an isometric view of oil cleaning apparatus constructed in accordance with the present invention, but without most of the hoses being shown.

FIG. 1 illustrates an oil cleaning apparatus 10 which has a housing 11 which forms a tank or reservoir 12 which contains a pool of oil 14. The particular apparatus shown is intended for use in a vehicle maintenance shop which often changes the motor oil and oil filters of vehicles. In one example, the shop changes the oil of ten vehicles per day, each vehicle yielding six quarts of oil and each oil filter yielding one quart of oil after it has been crushed to remove the oil. After oil is drained from a vehicle into a bowl, the contents of the bowl is poured into the reservoir through an opening 16. Similarly, when an oil filter is removed, it is crushed to remove most of the oil, and that oil is also dumped into the reservoir. After perhaps one month, the reservoir is largely filled. Previously, a reservoir 12 which might hold eighty gallons of oil, might be kept on the premises until removal by a service company which either recycles the oil (with any chemicals unknown to the servicing company) or which dumps the oil into a hazardous waste dump site. The present apparatus allows the shop to recycle the oil for use on the premises, so the oil does not have to be transported. If the shop owner takes steps to assure that only reusable oil is dumped into the reservoir, and not any chemicals which will not be removed in the recycling process and which might damage an engine, he can be confident that the recycled oil will be of high quality. The system is useful not only for petroleum based oils, but also for synthetic oils.

The oil cleaning apparatus includes oil-cleaning equipment that is mounted on the housing 11 to clean oil that has been dumped into the reservoir. The equipment includes a centrifuge 24 and a pump device 26 that is shown as including first and second pumps 30, 32, although a single pump could be used. The equipment also includes a directional valve 34 with two inlet and four outlets, input and output hoses or tubes 36, 38, and a porous filter device 40 (whose pores may be even of submicron size). An electrically energized motor 42 of the pump device, receives power through a cable 44 that is plugged into an ordinary (e.g. 110 volts) electrical wall outlet 46. The motor is the only piece equipment that is energized by an external power source, except for a possible heater (to reduce oil viscosity).

The particular apparatus includes a tank 50 forming the reservoir and a berm 52 which surrounds the tank and which is spaced from it by spacer beams 54 to leave an anti-leak basin therebetween. Any oil leaking out of the tank is caught by the berm. A recessed tank outlet 56 can be used to remove oil from the reservoir. A recessed berm outlet 57 can be used to remove oil from the berm. A recessed filter outlet 58 can be used to remove oil from the porous filter device 40 (which is done before changing the filter). The outlets 56, 57, 58 each includes a valve with a nipple that lies in a recess in berm 52, the recess protecting the nipples from damage and leakage resulting from being struck by other equipment, and protecting workers. The berm lies substantially facewise against the tank at the recess.

Figure 2:
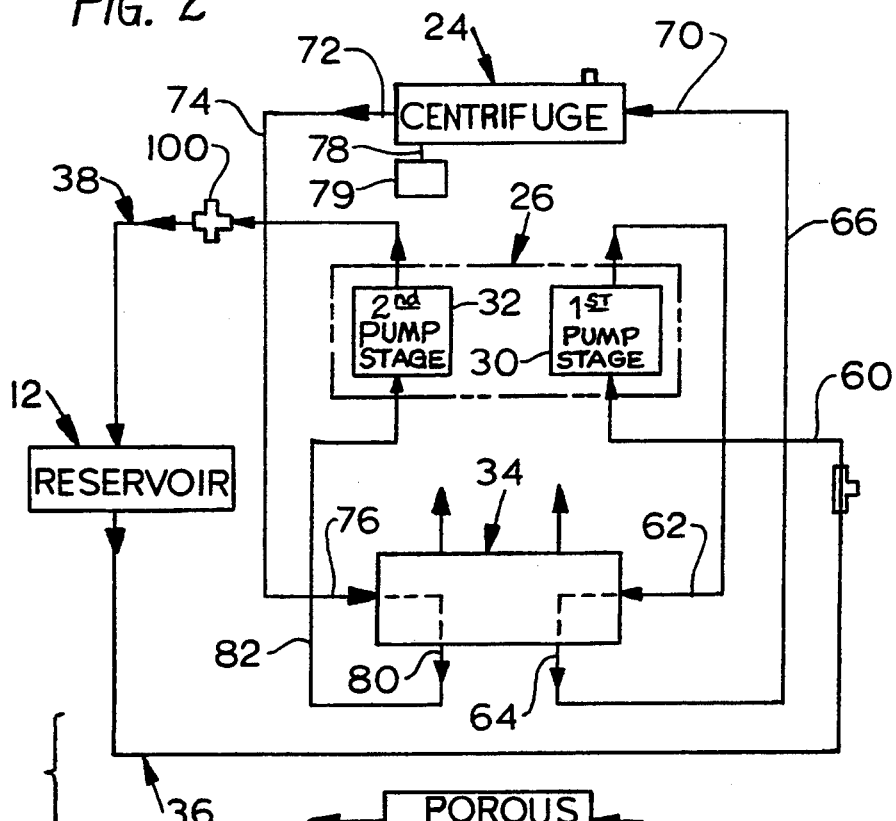
FIG. 2 is a diagrammatic view of the oil cleaning apparatus of FIG. 1, with the directional valve in a first state.

To start the cleaning operation so as to clean oil in the reservoir 12, applicant operates the directional valve 34 to make the connections shown in FIG. 2. In FIG. 2 oil from the reservoir passes out through the input tube 36 and the conduit 60 to the first stage suction pump 30, and from the pump to a first inlet port 62 of the directional valve. With the valve in the first state shown, the pumped fluid from the reservoir flows out through a first valve outlet 64 and through a conduit 66 to an oil inlet 70 of the centrifuge. Fairly well cleaned oil, wherein most of the original contaminants including water have been removed, flows out of the centrifuge oil outlet 72 and through a conduit 74 to a second valve inlet 76. Water and dirt (fine particles) flow out of the centrifuge through another centrifuge outlet 78 to a holding tank 79. With the valve in its first state, oil from the centrifuge flows out of a second valve outlet 80 through a conduit 82 to the second stage pump 32 and flows from the second stage pump along the output tube 38 back to the reservoir 12.

The centrifuge may be of the type described in U.S. Pat. No. 4,431,540, which uses pressured oil pumped to a moderate pressure, such as up to 70psi by the first stage pump 30. Fairly clean oil exiting from the centrifuge, exits through jets which drive the centrifuge. Such centrifuges are available, which have an internal oil storage volume of about 0.5 gallons and which have a through-put of about three gallons per minute. After about one-half hour of operation of the centrifuge, about 80 gallons of oil, which is the capacity of the reservoir, will have flowed through the centrifuge.

If applicant were to store all of the centrifuged oil before returning it to the reservoir, then after perhaps one-half hour, all of the oil in the reservoir would have been moderately cleaned, and this oil could be dumped back into the reservoir. However, this would require a storage container of about the same capacity as a reservoir to store the centrifuged oil, which would greatly increase the size of the oil cleaning apparatus. Instead, applicant runs the centrifuge a plurality of times more than the above-mentioned period of thirty minutes to clean an amount of oil which is a plurality of times the reservoir capacity. Preferably, applicant runs the centrifuge for at least five hours, so that at least ten times as much oil has passed through the centrifuge as the amount of oil (80 gallons maximum) in the reservoir. Although the cleaned oil returned to the reservoir constantly mixes with some dirty oil left in the reservoir, the large flow of oil through the centrifuge results in a high proportion usually at least 99% of the oil in the reservoir being as clean as the output of the centrifuge. The remainder, which is no more than about one percent of initially uncleaned oil, causes only mild contamination of the clean oil.

Figure 3:
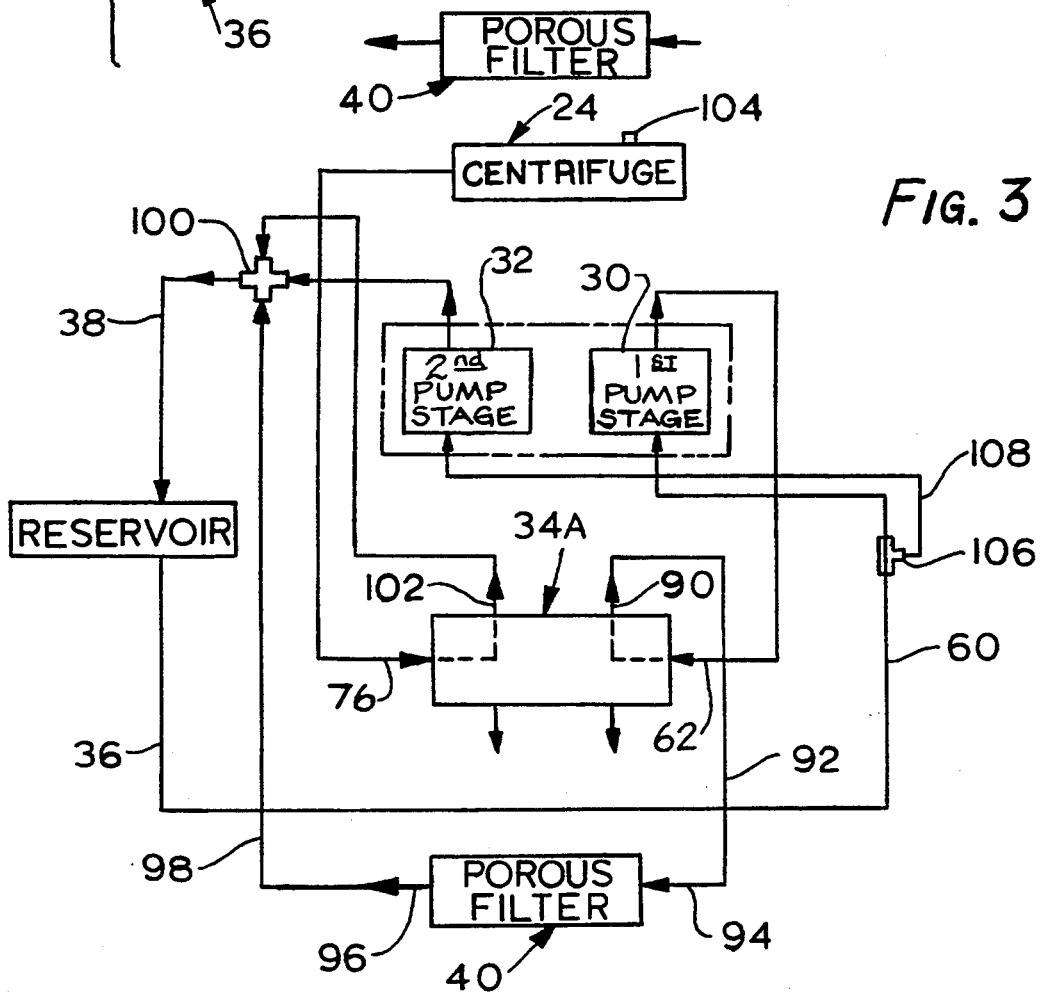
FIG. 3 is a view similar to that of FIG. 2, but with the directional valve in a second state.

FIG. 3 shows the equipment wherein the directional valve at 34A has been switched to its second state. In the second state, oil is drawn from the reservoir through the input tube 36 by the first stage pump 30. Oil flows from the pump into the first inlet port 62 of the valve and out through a third outlet port 90 of the valve. The oil then flows through a conduit 92 to the inlet 94 of the porous filter 40. The porous filter 40 is the type used in automobiles and trucks and which is packed with porous filter material, except that the particular porous filter 40 is larger than that in most vehicles, and the filter in constructed to remove water and to remove particles greater than 0.5 microns. Very clean oil exits from the porous filter through its outlet 96, and flows through a conduit 98 to a manifold 100 that connects to the output tube 38 that delivers the clean oil back to the reservoir 12. The flow rate through the particular filter 40, used with the above-described centrifuge, is about three to four gallons per minute. While the porous filter 40 produces extremely clean oil, the filter quickly becomes clogged if the oil flowing into the filter has a lot of contaminants such as dirt or water. The presence of the centrifuge 24 to remove most of the contaminants from the reservoir, prior to the relatively clean oil in the reservoir passing through the porous filter, results in a long life for the porous filter. A long life is desirable to minimize the considerable cost for the porous filter, and to save on the labor required in replacing the porous filter.

It may be noted that when the directional switch is in its second stage shown at 34A, oil left in the centrifuge 24 at the moment of switching passes through the second valve inlet 76 and out through a fourth valve output port 102 to the manifold 100. At that time, a bleeder valve 104 on the centrifuge opens, to allow oil to drain out of the centrifuge, the oil being drawn out partially by being drawn into the flow of oil through the manifold 100. It also should be noted that the coupling 106 is located along the inlet 60, so that some of the oil drawn from the reservoir passes through the conduit 108 through the second stage pump 32 to flow to the manifold, without passing through the porous filter. The reason for pumping oil through the second stage pump 32, is to keep the pump 32 constantly lubricated with oil in a simple manner, to avoid wear.

Where the reservoir contains its maximum of perhaps 80 gallons of oil, a plurality of hundreds of gallons, and preferably at least 800 gallons, is pumped through the porous filter to provide very clean oil for the reservoir. The valve 34 shown in FIG. 1, can be manually operated, and also can be set to be operated by a control box 110 which has controls that keep the valve in its first stage for a predetermined period such as five hours, and then automatically switches the valve to the second stage and operates it for another period such as another five hours, and then shuts off the electric motor 42 which is the sole externally energized part of the apparatus. After oil in the reservoir 12 has been cleaned, and a worker notices that the machine has shut down after the appropriate period of time, the oil is ready for reuse. In many cases, a "sweetener", which is an additive that reduces viscosity, may be mixed into the cleaned oil before reuse. A hand pump can be connected to the reservoir outlet 56, and the cleaned oil can be pumped into drums for reuse, as when changing a vehicle's motor oil. Alternatively, an output hose can be connected to the output of the first stage pump 30 and the motor 42 can be energized, to pump out oil from the reservoir.

The operator of a vehicle maintenance shop will take care that all of the oil dumped into the reservoir 12 does not hamper reuse of the oil. Where most of the oil used by the shop is motor oil, the shop can assure that only used motor oil is dumped into the reservoir 12 for reuse. Small quantities of other oil such as transmission oil, normally will not significantly degrade the performance of the oil when reused as motor oil.

It is desirable that the motor 42, which is the only energized part of the system, (except possibly for a control that operates the valve and that takes very little current) draw only moderate power. For example, a motor which draws 1500 watts usually can be energized during long periods of time through a 110 volt common wall socket. This allows the oil cleaning apparatus to be easily installed in any shop, without requiring rewiring. Applicant minimizes the required motor power output while producing a considerable flow through of oil to enable cleaning of a reservoir of considerable capacity (e.g. 80 gallons) in a moderate time period (one or two working days) by efficiently operating the system. That is, applicant prefers to direct all oil pumped by the use of the motor output, to flow either through the centrifuge or through the filter. Any flow through the centrifuge and filter in series or parallel is usually not useful in this system.

If there is justification for reuse of a different type of oil (e.g. transmission fluid or air condition fluid) which is not fully compatible with motor oil, such different type of oil can be temporarily stored for later processing by the apparatus 10. To process the different oil, the reservoir is drained and the centrifuge is largely drained, as by removing a plug (not shown) in it to drain out residual oil. The porous filter 40 is changed. Then the different oil is poured into the reservoir and the equipment is operated in the same manner as for the motor oil.

Thus, the invention provides apparatus for cleaning oil, which is especially useful for vehicle maintenance shops where small quantities of oil must be repeatedly stored for disposal or recycling. This is accomplished by mounting a reservoir and equipment on a housing. The equipment preferably includes a directional valve, a centrifuge, a pump device with at least one pump, input and output tubes leading from and to the reservoir, and a porous filter device. In one state of the valve, oil from the reservoir is passed solely through the centrifuge for a relatively good cleaning. The amount of oil passed through the centrifuge is preferably a plurality of times greater than the amount of oil in the reservoir, and preferably at least as ten times as great. After centrifuging the oil, the oil is pumped solely through the porous filter a plurality of times for fine cleaning. Thereafter the cleaned oil is ready for reuse.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. Apparatus adapted for receiving oil which is contaminated with water and dirt and for separating the oil from the water and dirt, comprising:
   a housing which includes a tank that forms a reservoir;
   a centrifuge mounted on said housing, said centrifuge having an oil inlet and an oil outlet;
   a pump device that includes at least one pump mounted on said housing;
   a directional valve device which is switchable between first and second states;
   an input tube for receiving oil from said reservoir;
   an output tube for discharging oil to said reservoir;
   a porous filter device of the type that contains packed porous filter material, said filter device having an inlet and outlet;
   said centrifuge, pump device, valve device and tubes being connected so when said valve device is in said first state, said input tube is connected through said pump device and valve to said centrifuge inlet to draw oil from said reservoir and deliver it to said centrifuge, and said centrifuge oil outlet is connected through said valve device to said output tube to deliver oil directly back to said reservoir;
   said filter device, pump device, valve device, and tubes being connected so when said valve device is in said second state, said input tube is connected through said pump device and valve to said filter device to draw oil from said reservoir and deliver it to said filter device, and said filter device outlet is connected to said output tube to deliver oil directly back to said reservoir substantially without having passed through said centrifuge.

2. The apparatus described in claim 1 including:
   a control which operates said valve device in said first state for a sufficient period to pass oil from said reservoir, when said reservoir is largely filled, through said centrifuge and back to said reservoir at least 10 times before switching to said second state.

3. The apparatus described in claim 1 wherein:
   said housing include a berm which surrounds said tank to capture any leaked oil, with more than half of the berm being spaced from said tank to leave an anti-leak basin between said tank and berm,
   said berm having a recess where the berm lies substantially facewise against said tank;
   said output tube including a valve nipple lying within said recess.

4. A method for use by a vehicle maintenance facility that receives quantities of contaminated oil that is contaminated by water and dirt, comprising:
   directly pouring quantities of contaminated oil into a reservoir of a separation machine from a container used to collect oil drained from vehicles receiving maintenance, where the separation machine includes a centrifuge, pump, valve, and porous filter;
   when said reservoir is largely filled, operating said pump to flow oil through said valve and said centrifuge while operating said centrifuge to separate water from the oil and produce cleaned oil, and flowing cleaned oil from said centrifuge directly back to said reservoir, until the quantity of oil which has passed through said centrifuge is a plurality of times greater than the amount of oil in said reservoir, when largely filled;
   after performing said step of operating said pump to flow oil through said valve and said centrifuge while operating said centrifuge and flowing cleaned oil from said centrifuge back to said reservoir until the quantity of oil which has passed through said centrifuge is a plurality of times greater than the amount of oil in said reservoir, when largely filled operating said valve to flow oil from said reservoir through said pump and through said porous filter and then back to said reservoir, while leaving said centrifuge substantially unoperated so substantially all oil flowing through said filter does not flow through said centrifuge;
   after performing said step of operating said valve to flow oil from and back to said reservoir through said filter, removing the filtered oil from said reservoir for reuse.

5. The method described in claim 4 wherein:
said step of operating said pump to flow oil through said valve and centrifuge, includes operating said pump continually for a long enough period that the quantity of oil which has passed through said centrifuge is at least 10 times as great as the amount of oil initially in said reservoir when largely filled.

* * * * *